United States Patent
Tamura et al.

(10) Patent No.: US 7,525,245 B2
(45) Date of Patent: Apr. 28, 2009

(54) ELECTRON BEAM EXCITED FLUORESCENCE EMITTING DEVICE

(75) Inventors: Kiyoshi Tamura, Chiba-ken (JP); Naoto Hirosaki, Ibaraki (JP)

(73) Assignees: Futaba Corporation (JP); National Institute for Materials Science (JP)

( * ) Notice: Subject to any disclaimer, the term of this patent is extended or adjusted under 35 U.S.C. 154(b) by 383 days.

(21) Appl. No.: 11/402,580

(22) Filed: Apr. 10, 2006

(65) Prior Publication Data

US 2006/0226764 A1     Oct. 12, 2006

(51) Int. Cl.
*H01J 1/62* (2006.01)
*H01J 63/04* (2006.01)

(52) U.S. Cl. .................. 313/495; 313/496; 313/483; 313/309; 313/310

(58) Field of Classification Search ......... 313/495–497, 313/483, 309–311, 336, 351, 346 R
See application file for complete search history.

(56) References Cited

U.S. PATENT DOCUMENTS

| 6,660,187 | B2 | 12/2003 | Noguchi et al. | |
|---|---|---|---|---|
| 2006/0091780 | A1* | 5/2006 | Minami | 313/495 |
| 2006/0192178 | A1* | 8/2006 | Hirosaki | 252/301.4 F |

FOREIGN PATENT DOCUMENTS

| JP | 2003055657 | 2/2003 |
|---|---|---|
| JP | 2004277663 | 10/2004 |
| JP | 2004285363 | 10/2004 |
| JP | 2005008794 | 1/2005 |

OTHER PUBLICATIONS

Grins et al.; The structures of the Ce and La N-Phases $Re_3Si_{8-x}Al_xN_{11-x}O_{4+x}$ (x=1.75 for RE=Ce, x=1.5 for RE=La), determined by single-crystal X-ray and time-of-flight neutron powder diffraction, respectively; J. Mater. Chem., 2001, vol. 11, pp. 2358-2362.

* cited by examiner

*Primary Examiner*—Karabi Guharay
*Assistant Examiner*—Kevin Quarterman
(74) *Attorney, Agent, or Firm*—Quarles & Brady, LLP

(57) ABSTRACT

A fluorescence emitting device is provided using a phosphor emitting a light by bombardment of an electron beam and having excellent luminance lifetime. The electron beam excited phosphor comprises a solid solution prepared by an AlN crystal or AlN solid solution crystal formed with at least Eu, Si and oxygen represented by the composition formula $Eu_a Al_b Si_c N_d O_e$ [Wherein a+b+c+d+e=1, and a, b, c, d and e satisfy the following conditions:
$0.00001 \leq a \leq 0.1$
$0.4 \leq b \leq 0.55$
$0.001 \leq c \leq 0.1$
$0.4 \leq d \leq 0.55$
$0.001 \leq e \leq 0.1$].

8 Claims, 5 Drawing Sheets

FIG.4

| | Δx | Δy |
|---|---|---|
| EXAMPLE | 0.003 | 0.002 |
| COMPARISON EXAMPLE 1 | 0.030 | 0.009 |
| COMPARISON EXAMPLE 2 | 0.029 | 0.009 |

ELECTRON BEAM EXCITED FLUORESCENCE EMITTING DEVICE

CROSS REFERENCE TO RELATED APPLICATION

This application claims the priority of Japanese Patent Application No. 2005-113596 filed Apr. 11, 2005.

STATEMENT REGARDING FEDERALLY SPONSORED RESEARCH

Not Applicable

BACKGROUND OF THE INVENTION

The present invention generally relates to a fluorescence emitting device using a phosphor emitting a light by an electron bombardment, and more particularly to an electron beam excited fluorescence emitting device having an excellent luminance lifetime, and driving at a driving anode voltage of 50V and above.

Conventionally, in a field emission display (hereinafter referred to as "FED") using a field emission cathode and a vacuum fluorescent display (hereinafter referred to as "VFD"), various kinds of phosphors has been used in order to obtain luminescent colors. A blue light emitting phosphor for use in a display excited by an electron beam bombardment is generally known in the Japanese Patent Publication No. 2003-55657 and the Japanese Patent Publication No. 2004-285363. The Japanese Patent Publication No. 2003-55657 discloses a low-velocity electron beam excited $(Y, Ce)_2 O_3 \cdot SiO_2$ phosphor emitting a blue light having the composition formula $[(Y, Ce)_2 O_3 \cdot nSiO_2 (\text{wherein } 0.4 \leq n \leq 1.0)]$. The Japanese Patent Publication No. 2004-285363 discloses ZnS: Ag, and Al, ZnS:Ag phosphor powders emitting a blue light which has less crystal defect and minimal degradation compared to conventional phosphor powders, if it is used for a long period of time. The phosphor disclosed in the Japanese Patent Publication No. 2004-285363 is effective for maintaining luminance of the phosphor, and to improve reliability or lifetime performance of a cold cathode field emission display.

On the other hand, a conventional phosphor is irradiated with an exciting source such as a light or electron beam having a high energy to emit a light. As a result, it has been a problem that the luminance of the phosphor is degraded due to the excitation of high energy. Accordingly, a phosphor exhibiting less luminance degradation is required. In order to provide a phosphor that complies with such a requirement, the Japanese Patent Publication No. 2004-277663 discloses α-type sialon phosphors emitting a blue light having a general formula $[(Si, Al)_{12}(O, N)_{16}]$. The Japanese Patent Publication No. 2005-8794 discloses α-type sialon phosphors illustrated by the composition formula $Ca_{0.25} Ce_{0.25}[(Si, Al)_{12}(O, N)_{16}]$.

It is to be noted that the $Y_2 SiO_5$: Ce phosphor disclosed in the Japanese Patent Publication No. 2003-55657 exhibits a remarkable decrease in luminous efficiency during its lifetime, and there is an extreme difference in the degree of degradation in RGB (red, green and blue), particularly "blue", when it is used for FED. Furthermore, the lifetime of a device incorporating the phosphor is short and loses color balance. In an FED excited at a driving voltage of approximately 3 kV, a metal is unlikely to be used due to the penetration depth of an electron.

The ZnS: Ag, Al phosphor containing sulfur as ZnS: Ag, Al disclosed in the Japanese Patent Publication No. 2004-285363 does not provide a satisfactory emission performance and device lifetime, because sulfur scatters by electron bombardment and contaminates the electron source.

In the sialon phosphor disclosed in the Japanese Patent Publications No. 2004-277663 and No. 2005-8794, there is no disclosure as to how the sialon phosphor is applied to a fluorescent emission device such as a field emission device and the like.

SUMMARY OF THE INVENTION

The present invention has been made taking the above-mentioned problems into consideration. An object of the present invention is to provide an electron beam excited fluorescence emitting device which is less degraded the luminance and excellent in lifetime performance and does not lose the balance of color.

BRIEF DESCRIPTION OF THE DRAWINGS

These and other objects, features, and advantages of the present invention will become more apparent upon a reading of the following detailed description and drawings, in which:

FIG. 4 is a table showing a rate of change in chromaticity between an electron beam excited fluorescence emitting device of the present invention and a fluorescence emitting device of a prior art.

BEST MODE FOR EMBODYING THE INVENTION

Figure 1:
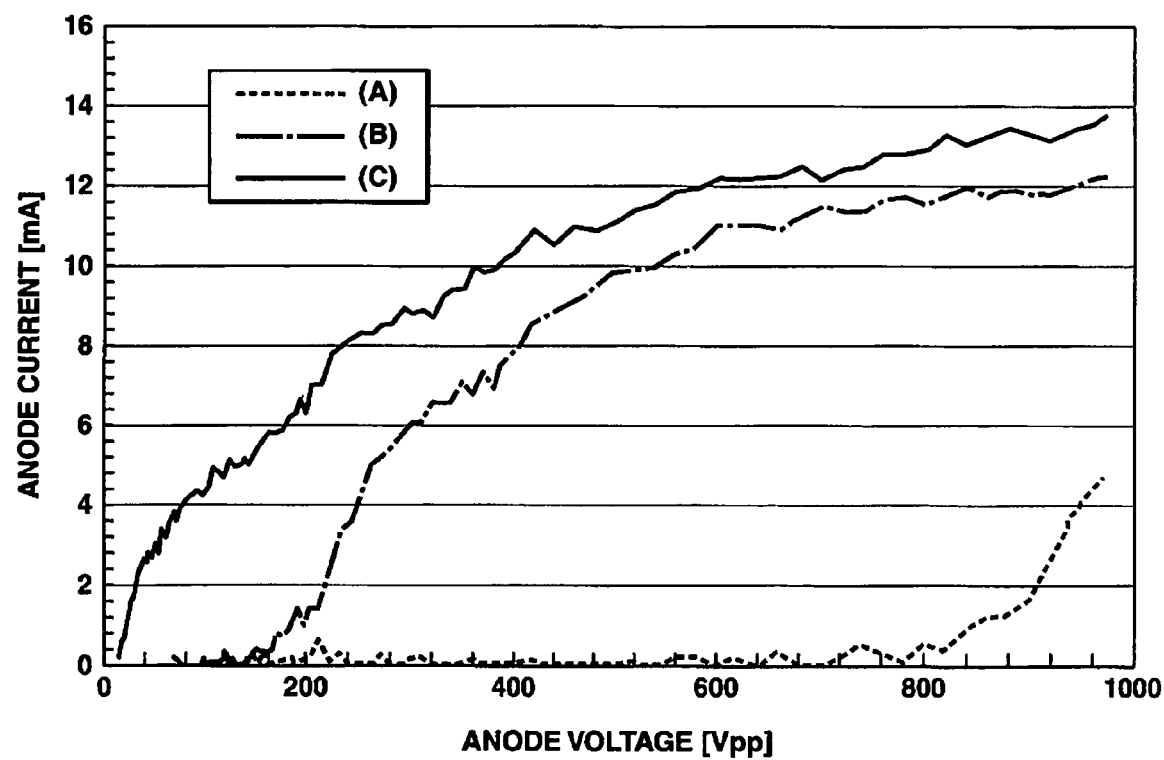
FIG. 1 is a graph showing a comparison of anode voltage with anode current between an electron beam excited fluorescence emitting device of the present invention and a fluorescence emitting device of a prior art.

Embodiments of the present invention will be described below with reference to the attached drawings.

In order to achieve the above objects, the present invention provides an electron beam excited fluorescence emitting device having a phosphor excited by an electron beam. The phosphor comprises a solid solution of an AlN crystal or AlN solid solution crystal formed with at least Eu, Si and oxygen. The phosphor is irradiated with an electron beam to emit fluorescence having a peak between a wavelength of 440 nm and 500 nm. The AlN crystal or AlN solid solution crystal is illustrated by the composition formula $Eu_a Al_b Si_c N_d O_e$:

[wherein $a+b+c+d+e=1$, and a, b, c, d and e satisfy the following conditions:

$0.00001 \leq a \leq 0.1$ $0.4 \leq b \leq 0.55$ $0.001 \leq c \leq 0.1$ $0.4 \leq d \leq 0.55$ $0.001 \leq e \leq 0.1$]

The AlN crystal or AlN solid solution crystal may contain an electroconductive material.

The electron beam excited fluorescence emitting device of the present invention includes a field emission source which emits an electron beam. The electron beam can be emitted from a filament shaped thermal electron emission source.

According to the electron beam excited fluorescence emitting device of the present invention, it is possible to emit a blue light with less luminance degradation and excellent luminance lifetime at a driving voltage of 50 V and above compared to prior fluorescence emitting devices. When the electron beam excited fluorescence emitting device of the present invention is used for such a display as FED or VFD, the balance of RGB (red, green and blue) can be maintained for the luminance lifetime and balance shifting of RGB can be suppressed.

The electron beam excited fluorescence emitting device of the present invention comprises a main component of an AlN crystal or AlN solid solution crystal activated by Eu (hereinafter referred to as "AlN:Eu"). As a result of experiments using various kinds of phosphor samples in a field emission display device in which the anode voltage is set at from hundreds V to several kV, the inventors of the present invention have discovered that a sialon phosphor is of great promise as a blue-light emitting phosphor for the field emission display device, because it is hardly scattered by the bombardment of electron of a high voltage. Furthermore, the inventors of the present invention have studied a phosphor emitting a blue light. As a result, it has been discovered that an AlN crystal or AlN solid solution crystal as a host crystal activated by Eu is useful for a phosphor.

An AlN crystal is a crystal having a wurtzite type crystal structure. An AlN solid solution crystal is a crystal which is formed by adding silicon or oxygen to AlN.

Examples of composition formulae of the AlN crystal or AlN solid solution crystal are described below:

(1) $2H\delta:Si_{2.40}Al_{8.60}O_{0.60}N_{11.40}$ (2) $27R:Al_9O_3N_7:1Al_2O_3\text{-}7AlN$ (3) $21R:Al_7O_3N_5:1Al_2O_3\text{-}5AlN$ (4) $12H:SiAl_5O_2N_5:1SiO_2\text{-}5AlN$ (5) $15R:SiAl_4O_2N_4:1SiO_2\text{-}4AlN$ (6) $8H:Si_{0.5}Al_{3.5}O_{2.5}N2.5:0.5SiO_2\text{-}0.5Al_2O_3\text{-}2.5AlN$ In the present invention, such crystals as described above can be used as a host crystal. The AlN crystal or AlN solid solution crystal can be identified by X-ray diffraction or neutron diffraction. Other than the substance showing the same diffraction as that of pure AlN crystal or AlN solid solution crystal, a crystal, the lattice constant of which is changed by substituting a constituent element for another element, is a part of the present invention. A pure AlN crystal or AlN solid solution crystal having a defect structure, stacking fault, or long period structure is also a part of the present invention so long as its fundamental diffraction data does not change.

In the present invention, the type of composition of crystal is not specifically defined so long as the crystal has a sialon crystal structure and contains Eu, Si, Al, O and N. However, a blue light emitting phosphor having high luminance can be obtained by the composition formula $Eu_a Al_b Si_c N_d O_e$ [wherein $a+b+c+d+e=1$, and a, b, c, d and e satisfy the following conditions:

(1) $0.00001 \leq a \leq 0.1$ (2) $0.4 \leq b \leq 0.55$ (3) $0.001 \leq c \leq 0.1$ (4) $0.4 \leq d \leq 0.55$ (5) $0.001 \leq e \leq 0.1$]

"a" in the composition formula represents the amount of addition of the element Eu and is preferably set so as to be $0.00001 \leq a \leq 0.1$ by atomic ratio. When the value of "a" is smaller than 0.00001, the luminance of emission lowers, because the number of Eu as a luminescent center is small. When the value of "a" is larger than 0.1, the luminance of emission lowers, because the density extinction occurs by the optical interference of Eu ions.

"b" in the composition formula represents the amount of Al constituting the host crystal and is preferably set so as to be $0.4 \leq b \leq 0.5$ by atomic ratio. When the value of "b" is beyond such range, bonding in crystal becomes unstable and the ratio of the generation of a crystalline phase increases other than AlN crystal or AlN solid solution crystal increases, which results in decreasing the emission intensity.

"c" in the composition formula represents the amount of Si and is preferably set so as to be $0.001 \leq c \leq 0.1$ by atomic ratio. When the value of "c" is smaller than 0.001, the charge compensation effect because small and the formation of solid solution of AlN crystal or AlN solid solution crystal with Eu and oxygen is inhibited and the emission intensity is decreased.

"d" in the composition formula represents the amount of nitrogen and is preferably set so as to be $0.4 \leq d \leq 0.55$ by atomic ratio. When the value of "d" is beyond the range, the ratio of the generation of a crystalline phase other than AlN crystal or AlN solid solution crystal increases, which results in decreasing the emission, intensity.

"e" in the composition formula represents the amount of oxygen and is preferably set so as to be $0.001 \leq e \leq 0.1$ by atomic ratio. When the value of "e" is smaller than 0.001, the formation of solid solution of AlN crystal or AlN solid solution crystal with M is inhibited and the emission intensity is decreased. When the value of "e" is larger than 0.1, the ratio of the generation of a crystalline phase other than AlN solid solution crystal increases, which results in decreasing the emission intensity.

A method of preparing the above AlN:Eu phosphor will be described below. It should be understood that the method of preparing AlN: Eu phosphor described below is an example and not limited thereto.

Silicon nitride powder having the average particle diameter of 0.5 μm, oxygen contents of 0.93 wt % and α contents of 92%, aluminum nitride powder having the specific surface are of 3.3 m$^2$/g and oxygen contents of 0.79 wt % and europium oxide powder having the purity of 99.9% were used as powder raw materials.

In order to obtain a compound represented by the composition formula $Eu_{0.002845}\ Al_{0.463253}\ Si_{0.02845}\ N_{0.501185}\ O_{0.004267}$, 6.389 wt % of silicon nitride powder, 91.206 wt % of aluminum nitride powder and 2.405 wt % of europium oxide powder were mixed for two hours by a wet ball mill using a pot made of sintered silicon nitride, a ball made of sintered silicon nitride and n-hexane.

N-hexane was removed by a rotary evaporator to obtain a dried product of mixed powder. The dried product of mixed powder thus obtained was pulverized by the use of a mortar made of an agate and pestle and passed thorough a 500 μm screen to obtain a powder aggregate excellent in fluidity. The powder aggregate was put into a crucible made of a boron nitride having a diameter of 20 mm and height of 20 mm to obtain a volume density of 30 vol %. The volume density was calculated from the weight of the powder aggregate charged, the internal space of the crucible and the true density of the powder (3.1 g/cm$^3$).

Then, the crucible was put into a resistance heating electric furnace made of a graphite. Calcination was carried out by having an atmosphere for calcinations evacuated by a diffusion pump, and the electric furnace was heated from a room temperature to 800° C. at a rate of 500° C. per hour. At a temperature of 800° C., nitrogen having a purity of 99.999 vol % was introduced into the atmosphere to set the gas pressure at 1 Mpa and heated to 2000° C. at a rate of 500° C. per hour and maintained at 2000° C. for two hours.

A sample thus synthesized was pulverized by the use of a mortar made of an agate and pestle, and a powder X-ray diffraction (XRD) measurement was carried out by the use of Kα line of Cu. As a result of analysis, it was confirmed that crystals having a wurtzite-type AlN structure were generated.

Cathode luminescence (CL) evaluation was carried out for VFD by the use of the AlN: Eu phosphor thus prepared as explained hereinafter.

First, the AlN: Eu phosphor is mixed in an organic solvent prepared by dissolving ethyl cellulose in butyl carbitol (trade name of DEG monobutyl ether manufactured by UCC) to prepare a paste. Then, the phosphor was deposited on an anode electrode by the use of the paste to prepare a VFD and evaluated. As a result, as shown in FIG. 1, when anode voltages of about 800v and above were applied, current flows through the anode, and it was confirmed to emit a light (line "A" in FIG. 1). For comparison, the same evaluation was made for $Y_2SiO_5$: Ce phosphor. As a result, as shown in FIG. 1, when the anode voltage is about 150 V, current flows through the anode, and it was confirmed to emit a light (line "B" in FIG. 1). Then, 5 wt % of ZnO was added as a conductive material in the AlN: Eu phosphor and evaluated. As a result, it was confirmed to emit a light (line "C" in FIG. 1) when anode current flows and the voltage lowers to about 100v.

Next, 5 wt % of ZnO were added as a conductive material in the AlN: Eu phosphor to prepare a mixture. Then, the mixture was mixed with an organic solvent prepared by dissolving ethyl cellulose in butyl carbitol (trade name of DEG monobutyl ether manufactured by UCC) to prepare a phosphor paste. Then, the phosphor was deposited on an anode electrode by the use of the paste to prepare a FFD, and an evaluation was carried out under driving conditions of an accelerating voltage of 3 kV, pulse duty driving 1/240, and current density of 8 mA/cm².

Figure 2:
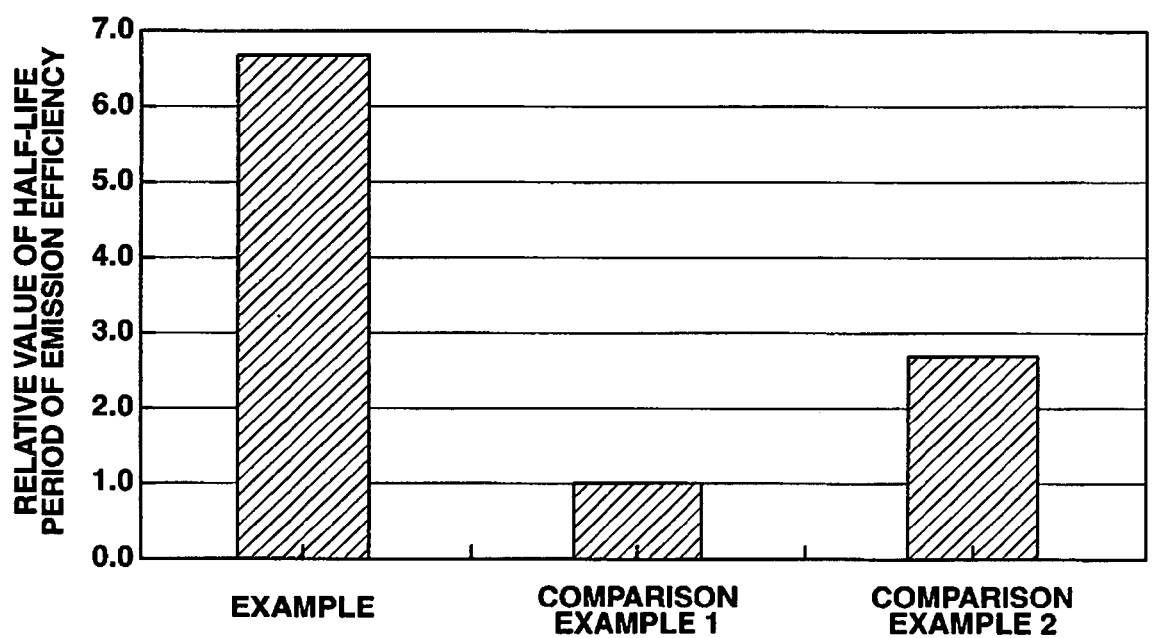
FIG. 2 is a graph showing a comparison of luminous efficiency between an electron beam excited fluorescence emitting device of the present invention and a fluorescence emitting device of a prior art.

FIG. 2 shows a relative value of the half life period of luminous efficiency under the above conditions. The Comparison Example 1 is for a fluorescence emitting device using the $Y_2SiO_5$: Ce phosphor. In the Comparison Example 2, a fluorescence emitting device using the ZnS: Ag, Al phosphor was used and the $Y_2SiO_5$: Ce phosphor was taken as a reference for 1.0. As a result of comparison, while the Comparison Example 1 was 1.0 and the Comparison Example 2 was 2.7, the example of the present invention was about 6.7. It was confirmed from these results that the lifetime of the emission efficiency of the example of the present invention increased by about 6.7 fold compared with the Comparison Example 1 and by about 2.5 fold compared with the Comparison Example 2.

Figure 3:
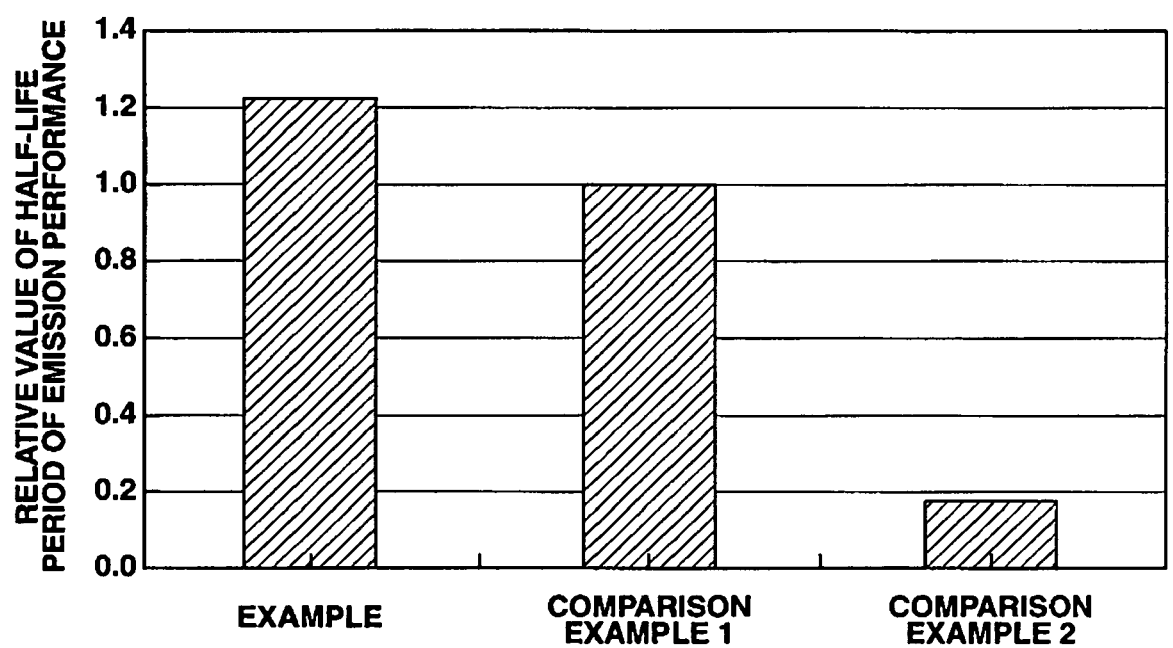
FIG. 3 is a graph showing a comparison of emission performance between an electron beam excited fluorescence emitting device of the present invention and a fluorescence emitting device of a prior art.

FIG. 3 shows a relative value of the half life period of emission performance under the same condition as that of FIG. 2. Comparison Example 1 is for a fluorescence emitting device using the $Y_2SiO_5$: Ce phosphor. In Comparison Example 2, a fluorescence emitting device using the ZnS: Cu, Al phosphor was used and the $Y_2SiO_5$: Ce phosphor was taken as a reference for 1.0. As a result of comparison, while the Comparison Example 1 was 1.0 and the Comparison Example was 0.19, the fluorescence emitting device of the present invention was about 1.21. It was confirmed from these results that the lifetime of the emission of the Example of the present invention increased by about 1.21 fold compared with the Comparison Example 1 and by about 6.4 fold compared with the Comparison Example 2.

FIG. 4 shows a change in the amount of chromaticity after 2000 hours life test for full lightning of FED. It was confirmed from FIG. 4 that the fluorescence emitting device of the present invention has almost no change in the chromaticity and is excellent in lifetime stability as compared with Comparison Example 1 using $Y_2Si_5$: Ce phosphor and Comparison Example using ZnS: Ag, Al phosphor.

The present invention will be further explained with reference to the following examples. It is, however, to be understood that the present invention is not intended to be limited to these examples and modifications and variations may be made by those skilled in the art without departing from the spirit and scope of the invention.

EXAMPLE 1

Figure 5:
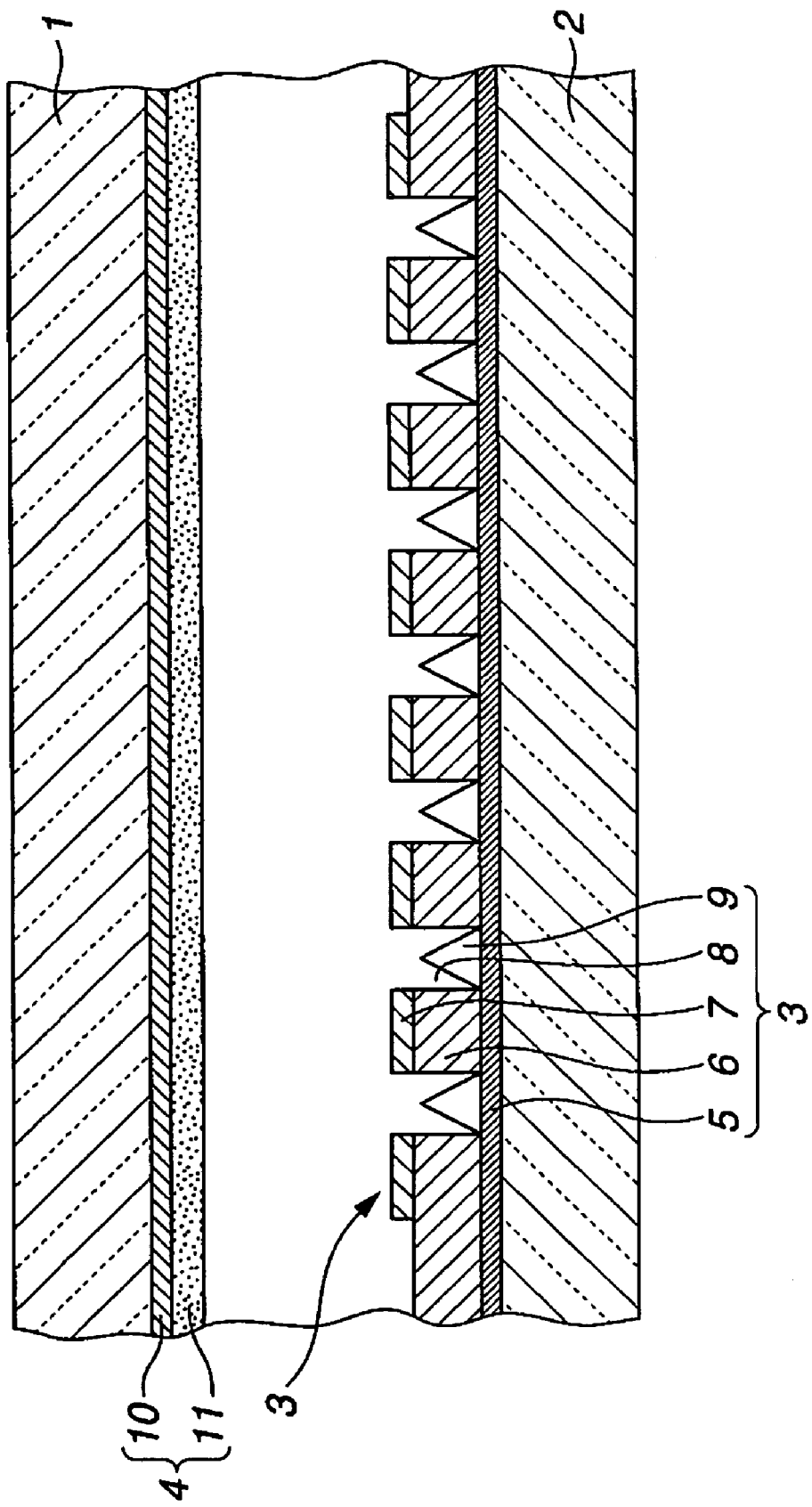
FIG. 5 is a cross section of a FED.

FIG. 5 is shows a structure of FED having an enclosure comprising an anode substrate 1 and a cathode substrate 2 placed oppositely each other. A field emission cathode 3 (FEC) as an electron source is formed on an inner surface of the cathode substrate 2 and a light emitting anode substrate 4 is formed on an inner surface of the anode substrate 1 opposite to the cathode substrate 2. FEC3 comprises a cathode conductor 5 formed on the cathode substrate 2, an insulating layer 6 formed on the cathode conductor 5, a gate 7 formed on the insulating layer 6, a hole 8 formed in the insulating layer 6 and the gate 7, and a cone shaped emitter 9 formed on the cathode conductor in the hole 8. The anode 4 comprises a transparent conductive film 10, for example, ITO formed as an anode conductor on the anode substrate 1 and a phosphor layer 11 deposited on the transparent conductive film 10. An electron emitted from FEC 3 collides with the phosphor layer 11 to make it emit a light. Light emission of the phosphor 11 can be observed from the outside of the anode substrate 1 through the light transmissible transparent conductor 10 and the anode substrate 1.

As a phosphor for use in the FED explained hereinabove, 5 wt % of ZnO fine particles having a particle diameter of 0.5 μm as a conducting agent were mixed with the phosphor emitting a blue light represented by the AlN: Eu phosphor and was dispersed in an organic solvent prepared by dissolving ethyl cellulose in butyl carbitol (trade name of DEG monobutyl ether manufactured by UCC) to prepare a paste. Then, the phosphor paste thus prepared was applied to the FED and its lifetime performance was evaluated. For comparison, two types of FEDs were prepared by the use of the $Y_2SiO_5$: Ce and the XnS: Ag, Al phosphors, respectively. Three types of FEDs using the AlN:Eu phosphor, $Y_2SiO_5$: Ce phosphor and XnS: Ag, Al phosphor thus formed were made to illuminate under the same conditions and evaluated for comparison. As a result, it was confirmed that Example 1 has an excellent lifetime stability compared with Comparison Examples 1 and 2.

EXAMPLE 2

5 wt % of ZnO fine particles having a particle diameter of 0.5 μm as a conducting agent were mixed with the phosphor emitting a blue light represented by the AlN: Eu phosphor and then dispersed in an organic solvent comprising ethyl cellulose and butyl to prepare a paste. Then, the phosphor paste thus prepared was applied to the FED similar to Example 1 and its lifetime performance was evaluated. As a result, the same effect was obtained as that obtained by Example 1.

EXAMPLE 3

5 wt % of ZnO fine particles having a particle diameter of 0.5 μm as a conducting agent were mixed with the phosphor emitting a blue light represented by the AlN: Eu phosphor and then dispersed in an organic solvent comprising ethyl cellulose and butyl to prepare a paste. Then, the VFD was prepared by the use of the phosphor paste thus prepared. When 50V were applied to the anode electrode, blue light emission having practical luminance was obtained.

EXAMPLE 4

5 wt % of ZnO fine particles having a particle diameter of 0.5 μm as a conducting agent were mixed with the phosphor emitting a blue light represented by the AlN: Eu phosphor and then dispersed in an organic solvent comprising ethyl cellulose and butyl to prepare a paste. Then, the VFD was prepared by the use of the phosphor paste thus prepared. When 50V were applied to the anode electrode, blue light emission having practical luminance was obtained similar to Example 3.

The electron beam excited fluorescence emitting device of the present invention described above can emit a blue light having an excellent luminance lifetime at a driving voltage of 50V and above. When the electron beam excited fluorescence emitting device of the present invention is used for a display such as FED or VFD, the shift of the balance of RGB (red, green and blue) colors can be suppressed, because of its excellent luminance lifetime.

Although the present invention has been described in its best mode of working embodiment with a certain degree of particularity, it is to be understood the present invention is not limited to the descriptions and drawings referred to the best mode. It is to be understood that another modes, examples and operation of technologies made by those skilled in the art on the basis of the mode are construed broadly within its spirit and scope as set out in the accompanying claims.

What is claimed is:

1. An electron beam excited fluorescence emitting device having an electron beam excited phosphor comprising a solid solution prepared with an AlN crystal or AlN solid solution crystal, wherein the crystalline phase is formed with at least Eu, Si and oxygen, and wherein the device emits fluorescence having a peak between a wavelength of 440 nm and 500 nm by irradiation with electron beam.

2. The electron beam excited fluorescence emitting device according to claim 1, wherein the phosphor includes an AlN crystal or AlN solid solution crystal represented by the composition formula $Eu_a Al_b Si_c N_d O_e$, wherein $a+b+c+d+e=1$, and a, b, c, d and e satisfy the following conditions:

$0.00001 \leqq a \leqq 0.1$
$0.4 \leqq b \leqq 0.55$
$0.001 \leqq c \leqq 0.1$
$0.4 \leqq d \leqq 0.55$
$0.001 \leqq e \leqq 0.1$.

3. The electron beam excited fluorescence emitting device according to claim 1, wherein an electroconductive material is added to the electron beam excited phosphor.

4. The electron beam excited fluorescence emitting device according to claim 1, wherein said electron beam is emitted from a field emission source.

5. The electron beam excited fluorescence emitting device according to claim 1, wherein said electron beam is emitted from a filament shaped thermal electron emission source.

6. The electron beam excited fluorescence emitting device according to claim 2, wherein an electroconductive material is added to the electron beam excited phosphor.

7. The electron beam excited fluorescence emitting device according to claim 2, wherein said electron beam is emitted from a field emission source.

8. The electron-beam excited fluorescence emitting device according to claim 2, wherein said electron beam is emitted from a filament shaped thermal electron emission source.

* * * * *

UNITED STATES PATENT AND TRADEMARK OFFICE
CERTIFICATE OF CORRECTION

PATENT NO. : 7,525,245 B2  Page 1 of 1
APPLICATION NO. : 11/402580
DATED : April 28, 2009
INVENTOR(S) : Tamura et al.

It is certified that error appears in the above-identified patent and that said Letters Patent is hereby corrected as shown below:

On the Title page please add
    Item -- (30)    Foreign Application Priority Data
    April 11, 2005 (JP) . . . . . . . . . . .2005-113596 --

Signed and Sealed this

Twenty-third Day of June, 2009

JOHN DOLL
*Acting Director of the United States Patent and Trademark Office*